(12) United States Patent
Komatsu et al.

(10) Patent No.: US 9,279,523 B2
(45) Date of Patent: Mar. 8, 2016

(54) DRAINPIPE, METHOD FOR PREVENTING BLOCKAGE OF DRAINPIPE AND INSTALLATION STRUCTURE OF DRAINPIPE

(71) Applicants: YOSHIDA ANNY CO. LTD., Akita (JP); AKITA UNIVERSITY, Akita (JP)

(72) Inventors: Yoshimi Komatsu, Akita (JP); Yoshihiro Yoshida, Akita (JP)

(73) Assignees: YOSHIDA ANNY CO. LTD., Akita (JP); AKITA UNIVERSITY, Akita (JP)

( * ) Notice: Subject to any disclaimer, the term of this patent is extended or adjusted under 35 U.S.C. 154(b) by 0 days.

(21) Appl. No.: 14/240,097

(22) PCT Filed: Dec. 26, 2012

(86) PCT No.: PCT/JP2012/083600
§ 371 (c)(1),
(2) Date: Feb. 21, 2014

(87) PCT Pub. No.: WO2013/099920
PCT Pub. Date: Jul. 4, 2013

(65) Prior Publication Data
US 2014/0182731 A1 Jul. 3, 2014

(30) Foreign Application Priority Data

Dec. 26, 2011 (JP) ................................. 2011-283396
May 9, 2012 (JP) ................................. 2012-107956

(51) Int. Cl.
*E03B 7/10* (2006.01)
*F16L 9/00* (2006.01)
*E03B 7/12* (2006.01)

(52) U.S. Cl.
CPC ... *F16L 9/00* (2013.01); *E03B 7/12* (2013.01); *F16L 9/006* (2013.01); *Y10T 29/49* (2015.01)

(58) Field of Classification Search
CPC ......... E04D 13/06; E04D 13/07; E04D 13/08; E04D 13/09; E04D 13/10; E04D 2013/0873; E04D 2013/088
USPC ............. 138/32, 27, 114, 177, 178; 52/12, 16
See application file for complete search history.

(56) References Cited

U.S. PATENT DOCUMENTS

| 70,365 | A | * | 10/1867 | Russell | 138/32 |
| 593,338 | A | * | 11/1897 | Snelgrove et al. | 138/114 |
| 1,742,392 | A | * | 1/1930 | Higgins | 138/38 |
| 2,869,927 | A | * | 1/1959 | Ayers | 239/110 |
| 4,651,781 | A | * | 3/1987 | Kandelman | 138/30 |
| 6,250,340 | B1 | * | 6/2001 | Jones et al. | 138/177 |
| 6,644,358 | B2 | * | 11/2003 | Demarest et al. | 138/177 |
| 6,719,953 | B2 | * | 4/2004 | Di Nicolantonio et al. | 422/198 |
| 6,789,579 | B1 | * | 9/2004 | Ryhman | 138/121 |

(Continued)

FOREIGN PATENT DOCUMENTS

| DE | 9305104.2 U1 | 7/1993 |
| EP | 2135691 A1 | 12/2009 |

(Continued)

OTHER PUBLICATIONS

International Search Report mailed Feb. 12, 2013; PCT/JP2012/083600.

*Primary Examiner* — Patrick F Brinson
(74) *Attorney, Agent, or Firm* — Ladas & Parry LLP

(57) ABSTRACT

A drainpipe comprising a concentrating flow path to concentrate flow of fluid on an inner wall of the pipe, which makes it possible to inhibit freezing of the fluid hydrodynamically without providing heat energy from outside, to thereby prevent blockage of the pipe.

10 Claims, 20 Drawing Sheets

(56) References Cited

U.S. PATENT DOCUMENTS

| | | |
|---|---|---|
| 7,967,029 B2 * | 6/2011 | Baur et al. .................... 138/27 |
| 2012/0132310 A1 | 5/2012 | Cavaliere et al. |

FOREIGN PATENT DOCUMENTS

| | | |
|---|---|---|
| EP | 2228579 A2 | 9/2010 |
| FR | 2942018 A1 | 8/2010 |
| JP | 54-059623 A | 5/1979 |
| JP | 63-214590 A | 9/1988 |
| JP | 03-199794 A | 8/1991 |
| JP | 3-90737 U | 9/1991 |
| JP | 10-321356 A | 12/1998 |
| JP | 3071180 U | 6/2000 |
| JP | 2002-235877 A | 8/2002 |
| JP | 2005-213809 A | 8/2005 |

\* cited by examiner

Fig. 20A
Fig. 20B
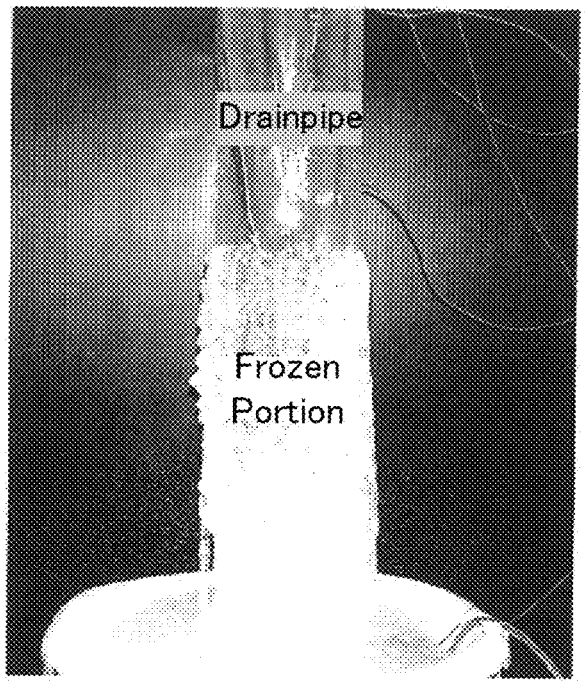
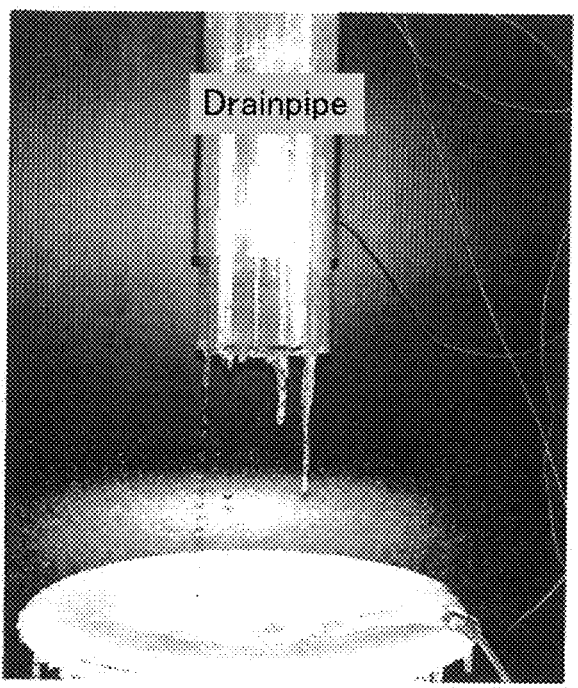

DRAINPIPE, METHOD FOR PREVENTING BLOCKAGE OF DRAINPIPE AND INSTALLATION STRUCTURE OF DRAINPIPE

TECHNICAL FIELD

The present invention relates to a drainpipe having a new structure by which freezing of fluid flowing inside the drainpipe can be inhibited, which enables to prevent blockage of the pipe due to freezing of the fluid.

BACKGROUND ART

In a cold region, there is a need to discharge, for example, snow accumulated on a roof in winter, to the ground efficiently via a drainpipe. In this regard, there is a problem that discharging water freezes inside the drainpipe or at an end portion on a downstream side of the drainpipe, whereby the drainpipe is blocked. If the drainpipe is blocked, the water is not discharged smoothly, whereby sometimes the water leaks indoors.

As a method of preventing freezing of discharging water inside the drainpipe, generally, a method of providing heat energy inside the drainpipe from outside, using a cord-shaped heater and the like is adopted (see Patent Document 1 for example). However, in such a method, a heater having a same height as a height of building is needed, whereby a running cost becomes large. In addition to this, a huge maintenance cost due to breakage and the like is required. Also, in a severely cold region, sometimes the drainpipe is installed indoors, whereby there is a large problem of installation space and design of the drainpipe.

CITATION LIST

Patent Literatures

Patent Document 1: Japanese Patent Application Laid-Open No. H10-321356

SUMMARY OF THE INVENTION

Problems to be Solved by the Invention

The present invention has been made considering the above conventional technique, and an object of the present invention is to provide a drainpipe that enables to hydrodynamically inhibit freezing of fluid to thereby prevent blockage of the pipe without providing heat energy from outside.

Means for Solving the Problems

The inventors of the present invention have presumed that freezing of fluid inside the drainpipe and blockage of the drainpipe are occurred by the following mechanism.

(I) For example, snow accumulated on roof gradually melts. Normally, meltwater does not flow into the drainpipe in large quantity, but discharges gradually streaming down inner wall of the drainpipe. In such a case, liquid membrane is formed across a relatively wide area of the inner wall of the pipe, whereby stream of the meltwater easily diverges. Therefore, influence from surface tension becomes large to lower flowing speed of the meltwater, and at the same time, contact area of the water with air becomes large whereby temperature decrease is promoted, as a result, discharging water becomes easy to freeze. Because of this, blockage of the drainpipe due to freezing of the discharging water inside the drainpipe occurs.

(II) Even though not freezing inside the drainpipe, the discharging water freezes at an end portion on a downstream side of the drainpipe to thereby become an ice pillar. The ice pillar is easily made especially on a surface of cut area of the end portion on the downstream side of the drainpipe (thickness portion of the drainpipe). As mentioned above, the discharging water that came into liquid membrane in the drainpipe diverges because of its unsteady stream, which makes ice pillars everywhere at the end portion on the downstream side of the drainpipe. The ice pillars grow as time passes, and their adjacent grown pillars are joined together to be a large block, whereby eventually blockage occurs due to freezing of the discharging water at the end portion on the downstream side of the drainpipe.

The inventors of the present invention, based on the above presumption, proceeded with an intensive study about a structure of the drainpipe that enables to hydrodynamically inhibit freezing of fluid to thereby prevent blockage of the drainpipe. The inventors have found out, as a result of the study, that it is possible to inhibit the freezing of the fluid to thereby prevent blockage of the pipe by the following structure and method.

(1) By making flow of the fluid not to diverge, or by preventing the fluid from becoming liquid membrane, it is possible to inhibit freezing of the fluid inside the drainpipe. More specifically, by concentrating the flow of the fluid, it is possible to reduce influence of surface tension, to thereby increase the flowing speed of the fluid. At the same time, it is possible to reduce the contact area with air, to thereby inhibit temperature decrease. Because of this, it is possible to inhibit freezing of the fluid to thereby prevent blockage inside the drainpipe.

(2) In order to concentrate the flow of the fluid, it is effective that inner wall of the pipe comprises a concave portion or a groove along a flowing direction of the fluid (longitudinal direction of the pipe).

(3) By concentrating the flow of the fluid, it is possible to limit the place where the ice pillars are made at the end portion on the downstream side of the drainpipe. That is, at the end portion on the downstream side of the drainpipe, since the ice pillars are not adjacent to each other, it is possible to inhibit the ice pillars from growing in a circumferential direction and the like, to thereby prevent the blockage of the end portion on the downstream side of the drainpipe.

(4) By providing a projecting portion to the end portion on the downstream side of the drainpipe, it is possible to make the ice pillars concentrating in a top end of the projecting portion. This makes it possible to inhibit growing of the ice pillars, to thereby prevent the blockage of the end portion on the downstream side of the drainpipe. Especially, it is effective to design the drainpipe such that the projecting portion exists directly below the flow of the fluid.

(5) By making the end portion on the downstream side of the drainpipe thin-walled, it is possible to reduce the amount of the fluid retained at the end portion on the downstream side of the drainpipe. This makes it possible to further inhibit growing of the ice pillars, to thereby prevent the blockage of the end portion on the downstream side of the drainpipe.

(6) A thickness of a base portion of the ice pillar came out at the end portion on the downstream side of the drainpipe depends on the flowing speed of the fluid or pipe wall thickness of the end portion on the downstream side of the drainpipe. By increasing the flowing speed of the fluid and at the same time making the end portion on the downstream side of the drainpipe thin-walled, it is possible to keep the base portion of the ice pillar thin, to thereby make the ice pillar easy to break. Namely, since the ice pillar breaks before growing, it is possible to inhibit growing of the ice pillar, to thereby prevent blockage of the end portion on the downstream side of the drainpipe.

(7) By carrying out water repelling treatment to the inner wall of the drainpipe or to the end portion on the downstream side of the drainpipe, it is possible to prevent generation of the liquid membrane to thereby increase the flowing speed of the fluid. It is also possible to reduce the amount of liquid drops that gathers to the end portion of the downstream side. This makes it possible to prevent blockage inside the drainpipe and blockage of the end portion on the downstream side of the drainpipe.

(8) By making the drainpipe have a double-pipe structure to thereby provide an air layer between an inner pipe and an outer pipe, it is possible to make the air layer function as a heat insulting layer, which enables inhibiting temperature decrease inside the pipe, even when the temperature outside the drainpipe is decreased rapidly.

The present invention has been made based on the above findings. Namely, a first aspect of the present invention is a drainpipe comprising a concentrating flow path to concentrate a flow of fluid on inner wall of the drainpipe.

In the present invention, "fluid" means any fluid that can stream down the inner wall of the pipe. The present invention can be widely applied to even a case to flow a fluid other than water (organic solvents and the like) as well, as the invention that can prevent pipe blockage due to freezing of the fluid. However, as a configuration in which effect of the present invention is remarkably seen, it is preferable to apply to water discharge of snowmelt and the like in a cold region. In the present application, "cold region" refers to a region where the temperature is below freezing (0° C. or less), preferably −5° C. or less, more preferably −10° C. or less, still preferably −15° C. or less. The term "drainpipe" mostly refers to a pipe that can flow discharging water, but not limited to this. The present invention can be applied as a water supplying pipe, pipework and the like that can prevent blockage of pipe due to freezing of fluid, and a configuration thereof can be included in the present invention. However, as a configuration in which effect of the present invention is remarkably seen, it is preferable to apply as a drainpipe installed to a house or a building in a cold region and used for water discharge. More specifically, "concentrating flow path to concentrate a flow of fluid" refers to a flow path capable of increasing the flowing speed of fluid to thereby inhibit generation of liquid membrane and diverged stream, by concentrating the flow of fluid.

In the first aspect of the present invention, the concentrating flow path is preferably arranged in a linear fashion along the longitudinal direction of the pipe, since the arrangement exerts the effect of freezing prevention and the effect of pipe blockage prevention due to the freezing more notably by the present invention.

In the first aspect of the present invention, it is preferable that the concentrating flow path is a concave portion or a groove arranged on the inner wall of the pipe along a flowing direction of fluid (especially preferably, the longitudinal direction of the pipe). This configuration makes it possible to concentrate the flow of the fluid more efficiently, to thereby increase the flowing speed.

The drainpipe according to the first aspect of the present invention preferably has a configuration in which the concentrating flow path has a corner portion in a cross sectional shape of the drainpipe. In other words, the concentrating flow path preferably has an apex convexed toward outside of the pipe in a cross sectional shape of the concentrating flow path. For example, in a case that a concave portion or a groove is provided as the concentrating flow path, preferably bottom of the concave portion or the groove is the corner portion.

In the first aspect of the present invention, a plurality of the concentrating flow paths may be provided on the inner wall of the pipe.

In this case, a wall can be provided along the flow paths between one of the plurality of the concentrating flow paths and another concentrating flow path of the plurality of the concentrating flow paths. This makes it possible to inhibit the fluid from flowing over from one of the plurality of the concentrating flow paths into adjacent another one of the plurality of the concentrating flow paths to thereby concentrate the flow of the fluid more efficiently.

In the first aspect of the present invention, it is preferable that a projecting portion is provided to the end portion on the downstream side of the pipe. The term "a projecting portion is provided" refers that a part of the end portion on the downstream side of the pipe is extended in an outflow direction of the fluid. This makes it possible to generate ice pillars concentrating to a top end of the projecting portion, to thereby prevent the blockage of the end portion on the downstream side of the drainpipe.

In the first aspect of the present invention, preferably the end portion on the downstream side of the pipe is made to be thin-walled compared with a portion on an upstream side. This makes the ice pillars generated at the end portion break on their own whereby it is possible to inhibit growing of the ice pillars.

In the first aspect of the present invention, it is preferable that water repelling treatment is carried out to the inner wall and/or the end portion on the downstream side of the pipe. This makes it possible to increase the flowing speed of the fluid, and it is also possible to inhibit growing of the ice pillars at the end portion on the downstream side of the drainpipe. As the "water repelling treatment", any of different kind of water repelling treatments can be adopted, such as a configuration in which a known water repelling agent is applied, a configuration in which a surface structure of the inner wall and the end portion is controlled to be a water-shedding surface and the like.

In the first aspect of the present invention, preferably an outer pipe to cover the pipe is further comprised to make the present invention have a double-pipe structure. By providing the outer pipe, it is possible to protect the pipe having a concentrating flow path (inner pipe) to thereby improve durability of the drainpipe. Also, since an air layer can be formed between the inner pipe and the outer pipe, heat insulting effect can be promised.

The drainpipe according to the first aspect of the present invention is suitable as a drainpipe used for preventing freezing, in other words, the drainpipe can be suitably applied as a drainpipe to discharge water, in a place where the temperature is below freezing (0° C. or less), preferably −5° C. or less, more preferably −10° C. or less, still preferably −15° C. or less.

A second aspect of the present invention is a method of preventing blockage of a drainpipe due to freezing of fluid flowing inside the drainpipe, the method comprising providing a concentrating flow path to concentrate stream of the fluid, to thereby increase flowing speed of the fluid in the concentrating flow path.

In the second aspect of the present invention, preferably the fluid is flowed streaming down the inner wall of the pipe. In other words, the second aspect of the present invention is a method of preventing the drainpipe from being blocked due to freezing of the fluid flowing inside the drainpipe, the method preferably comprising the steps of: discharging the fluid such that the fluid streams down the inner wall; and providing a concentrating flow path to concentrate the flow of the fluid in the inner wall of the pipe to thereby increase flowing speed of the fluid in the concentrating flow path.

Especially, in the second aspect of the present invention, it is preferable that the drainpipe is installed such that the longitudinal direction of the pipe and a vertical direction correspond to each other, to thereby flow the fluid down with the fluid streaming from an upper end side to a lower end side of the pipe. This is because the effect of freezing prevention and the effect of pipe blockage prevention by the present invention are exerted more notably. In the present invention, "the longitudinal direction of the pipe and a vertical direction correspond to each other" does not necessary mean that the longitudinal direction of the pipe and the vertical direction completely correspond to each other, but ±5° of difference (that is, an angle between the longitudinal direction of the pipe and the horizontal direction is 85° or more to 95° or less) is allowed as an error range. Further, there is no need that "the longitudinal direction of the pipe and the vertical direction correspond to each other" for entire part of the drainpipe, and the present invention includes a drainpipe that has at least a part in which "the longitudinal direction of the pipe and the vertical direction correspond to each other".

In the second aspect of the present invention as well, the concentrating flow path is preferably arranged in a linear manner along the longitudinal direction of the pipe, since the arrangement exerts the effect of freezing prevention and the effect of pipe blockage prevention due to the freezing more notably by the present invention.

In the second aspect of the present invention as well, it is preferable that the concentrating flow path is a concave portion or a groove arranged on the inner wall of the pipe along the flowing direction of fluid (especially preferably, the longitudinal direction of the pipe).

In the second aspect of the present invention as well, the concentrating flow path of the drainpipe preferably has a corner portion in a cross sectional shape of the drainpipe.

Also, in the second aspect of the present invention, a plurality of the concentrating flow paths can be arranged in the inner wall of the pipe.

In this case, a wall can be provided along the flow path between one of the plurality of the concentrating flow paths and another one of the plurality of the concentrating flow paths.

Also, in the second aspect of the present invention, by providing a projecting portion to the end portion on the downstream side of the pipe, it is possible to inhibit growing of the ice pillars more efficiently.

Also, in the second aspect of the present invention, by making the end portion on the downstream side of the pipe thin-walled compared with a portion on the upstream side, it is possible to inhibit growing of the ice pillars further efficiently.

Further, in the second aspect of the present invention, by applying a water repelling treatment to the inner wall and/or the end portion on the downstream side of the pipe, it is possible to prevent freezing of the fluid and blockage more efficiently.

Further, by making the pipe a double-pipe structure providing an outer pipe to cover the pipe, it is possible to obtain effects of inner pipe protection and heat insulting.

A third aspect of the present invention is an installation structure of the drainpipe, wherein the drainpipe according to the first aspect of the present invention is installed.

In the third aspect of the present invention, it is preferable to have a structure in which the fluid flows streaming down the inner wall of the pipe. Especially, it is preferable to have an installation structure, by installing the drainpipe such that the longitudinal direction of the pipe and the vertical direction correspond to each other, in which the fluid flows streaming down from the upper end side to the lower end side of the pipe. This is because the installation structure exerts the effects of freezing prevention and pipe blockage prevention more efficiently.

The installation structure of the third aspect of the present invention is especially suitable as an installation structure for freezing prevention, in other words, it is preferable as an installation structure of the drainpipe in a place where the temperature is below freezing (0° C. or less), more preferably −10° C. or less, still preferably −15° C. or less.

Effects of the Invention

According to the present invention, by concentrating the flow of the fluid inside the drainpipe, it is possible to increase the flowing speed of the fluid, and at the same time, it is possible to discharge the fluid only from apart of the end portion on the downstream side of the drainpipe. This makes it possible to inhibit freezing of the fluid inside the drainpipe, and at the same time, it is possible to inhibit growing of the ice pillars at the end portion on the downstream side of the drainpipe. That is, according to the present invention, it is possible to hydrodynamically inhibit freezing of the fluid, to thereby prevent blockage of the drainpipe without providing heat energy from outside.

BRIEF DESCRIPTION OF THE DRAWINGS

FIG. 1A is an example of a conventional technique, and FIG. 1B is an example of the present invention;

FIGS. 20A and 20B are views showing experimental results, FIG. 20A is a case in which a conventional cylindrical drainpipe is used, and FIG. 20B is a case in which a drainpipe according to the present invention is used.

MODES FOR CARRYING OUT THE INVENTION

1. Drainpipe

Figure 1A:
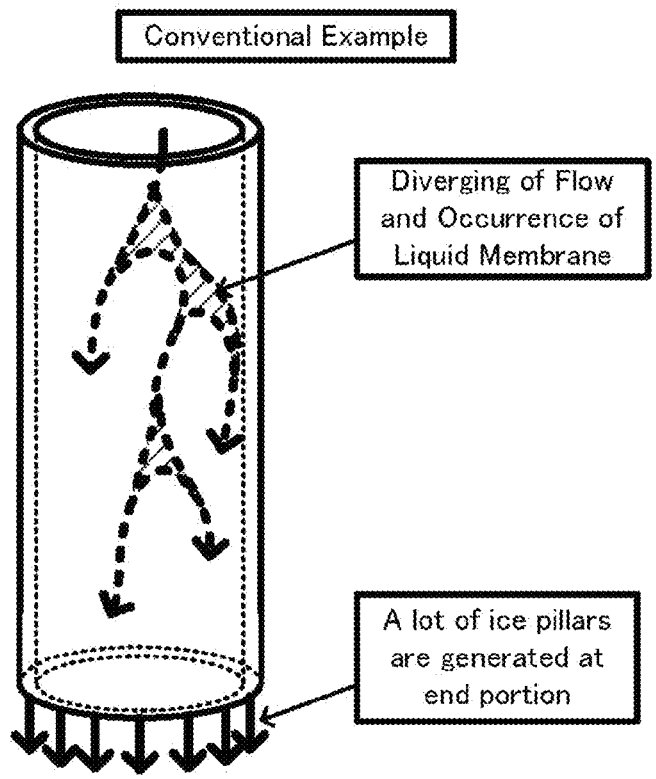
FIGS. 1A and 1B are schematic views to illustrate a concept of the present invention.
Figure 1B:
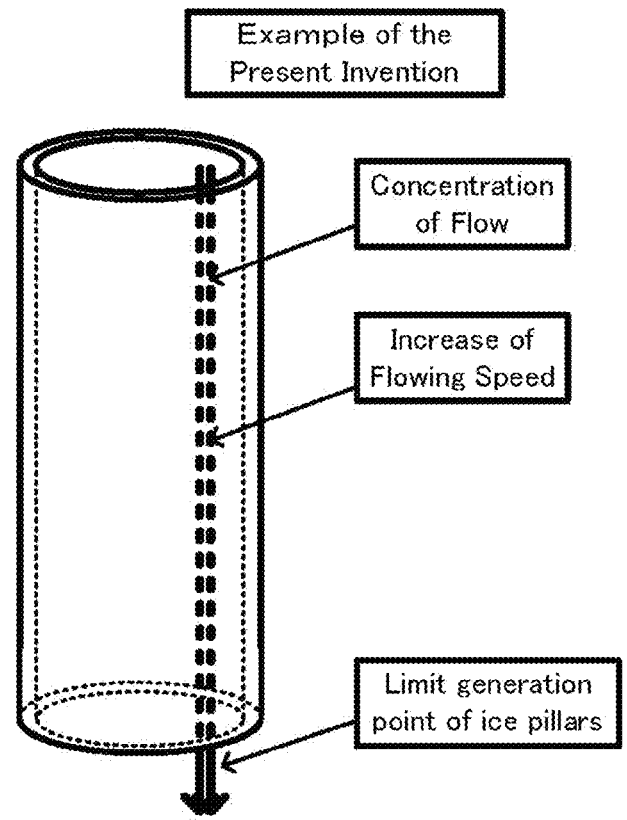

The drainpipe according to the present invention has a feature in comprising a concentrating flow path on the inner wall of the pipe to concentrate the flow of fluid. That is, as shown in FIG. 1, especially in a case in which a fluid flows streaming down inner wall of a drainpipe that is installed such that a longitudinal direction of the pipe and the vertical direction correspond to each other, when the drainpipe is a conventional drainpipe, the flow of the fluid becomes unsteady then diverges, or, a fluid membrane is generated (FIG. 1A), whereby making the fluid frozen inside the drainpipe and generating and growing a lot of ice pillars at an end portion on the downstream side of the drainpipe. On the other hand, in the drainpipe according to the present invention, flow of the fluid is concentrated to the concentrating flow path (FIG. 1B), whereby reducing influence of surface tension to increase flowing speed of the fluid, and at the same time, whereby limiting generating points of the ice pillars at the end portion on the downstream side of the drainpipe, to thereby inhibit freezing of the fluid inside the drainpipe and growing the ice pillars at the end portion on the downstream side of the drainpipe. Hereinafter, specific examples of drainpipes that comprise the concentrating flow path will be described.

1.1. First Embodiment

Figure 2:
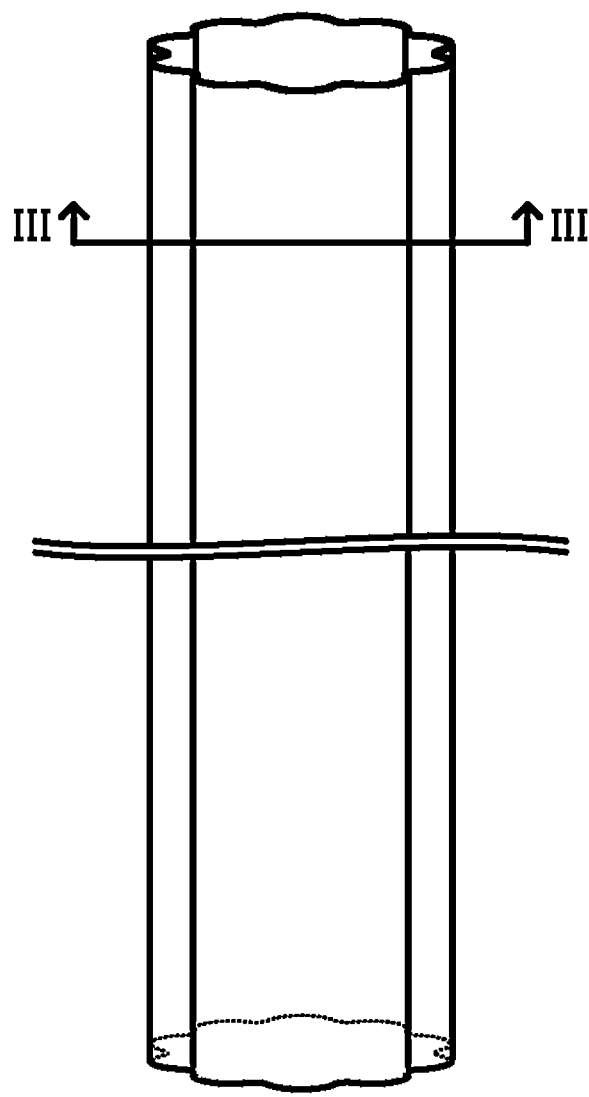
FIG. 2 is a schematic view to illustrate a drainpipe 10 according to the present invention.
Figure 3:
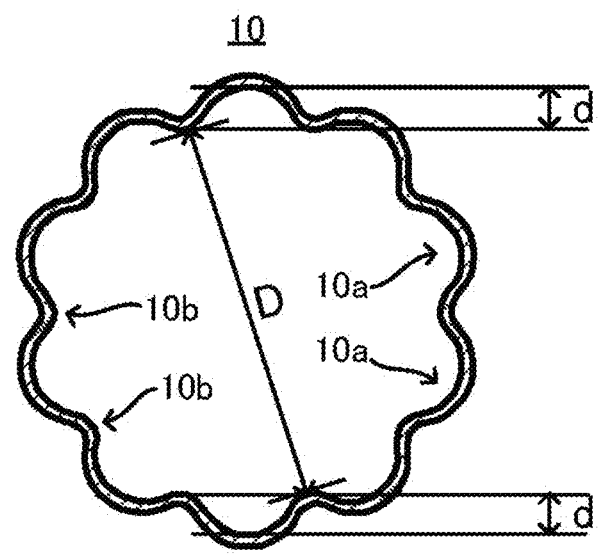
FIG. 3 is a view schematically showing a cross sectional shape of the drainpipe 10 according to the present invention.

In FIGS. 2 and 3, a drainpipe 10 according to a first embodiment of the present invention is schematically shown. FIG. 2 is a perspective view of the external of the drainpipe 10, FIG. 3 is a view schematically showing a cross sectional shape taken along in FIG. 2 and seen in the direction of the arrows. As shown in FIG. 2, the drainpipe 10 is a pipe extending in the longitudinal direction having a predetermined cross sectional shape.

As shown in FIG. 3, on an inner wall of the drainpipe 10, concave portions 10a, 10a, . . . and convex portions 10b, 10b, . . . arranged along a flowing direction of the fluid (the longitudinal direction of the pipe) are comprised. Here, in the drainpipe 10, each concave portion 10a and each convex portion 10b are arranged alternately. In the drainpipe 10, since it is possible to concentrate the flow to the concave portion 10a, the concave portion 10a can function as the concentrating flow path. Also, by arranging the convex portion 10b between adjacent concave portions 10a, 10a, it is possible to inhibit the fluid from flowing over from one concave portion 10a of the adjacent concave portions 10a, 10a into the other concave portion 10a of the adjacent concave portions 10a, 10a, to thereby inhibit diverging of flow of the fluid.

The drainpipe 10 shown in FIG. 3 is configured, in both of the concave portion 10a and the convex portion 10b, by curved surfaces. In other words, the drainpipe 10 does not have a corner portion in a cross sectional shape. Normally, ice pillars in the end portion on the downstream side of the drainpipe are easily generated at a corner portion of end surface. In the drainpipe 10, by making the drainpipe 10 not to have a corner portion in the cross sectional shape, it is possible to further inhibit generating of the ice pillars in the end portion on the downstream side of the drainpipe 10. However, the inventors have found out as follows by the intensive study. As a drainpipe 100 mentioned below (see FIGS. 15 and 16), in a case that the above mentioned concave portion is shaped in a manner to have an apex (symbol 100c in FIG. 16) convexed toward outside of the pipe (that is, in a case that bottom of the concave portion provided on the inner wall of the drainpipe is a corner portion), the end portion on the downstream side of the drainpipe is easy to be a generation point of an ice pillar since liquid drops tend to be gathered thereto. However, it is possible to increase the flowing speed of the fluid in the concave portion, then the fluid becomes easy to flow from one part of the end portion on the downstream side of the drainpipe, whereby the ice pillar is difficult to grow in a circumferential direction or toward a center direction. In other words, even if there is a drawback that the liquid drops tend to be gathered in the lower end portion, as the drainpipe 100 mentioned below, it is effective to prioritize the function to discharge the fluid from one part.

Diameter of the drainpipe 10 (a largest outer diameter of a cylindrical pipe that can be inserted in the drainpipe, length D in FIG. 3) is normally 70 mm to 120 mm, but not limited to this range. The diameter of the drainpipe 10 can be adjusted in accordance with an assumed flowing amount of the fluid (discharging amount). Depth of the concave portion 10a (a distance between a straight line connecting each apex of the adjacent convex portions 10b, 10b and the bottom portion of the concave portion 10a between the adjacent convex portions 10b, 10b, a length d in FIG. 3) is, when defining the depth as a ratio of a length d to the above length D (d/D), normally from 0.1 to 0.4, but not limited to this range. The depth of the concave portion 10 can be adjusted in accordance with the assumed flowing amount. Entire length of the drainpipe 10 may be arbitrarily adjusted corresponding to installation location.

Material of the drainpipe 10 is not particularly limited. A metal such as stainless steel and the like, or, plastics such as polyvinyl chloride and the like, which has been used as a material to configure a drainpipe can be adequately chosen. Particularly, it is preferable to use a metal such as stainless steel in view of durability.

Figure 4:
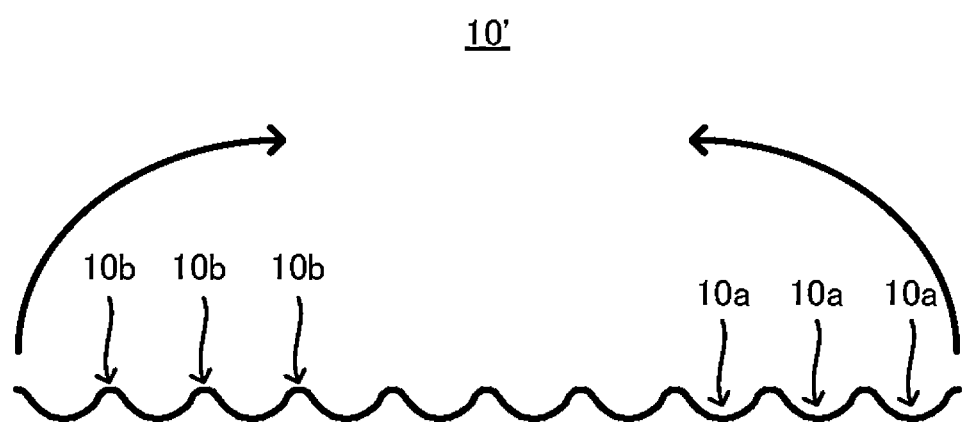
FIG. 4 is a schematic view to illustrate one example of manufacturing method of the drainpipe 10 according to the present invention.

The drainpipe 10 can be manufactured by various methods. For example, the drainpipe 10 can be continuously formed by various forming methods such as extrusion molding and the like. The drainpipe 10 also can be manufactured easily, as shown in FIG. 4, by preparing a sheet-shaped body 10' provided with the concave portions 10a, 10a, . . . and the convex portions 10b, 10b, . . . alternately, and lapping both end portions of the sheet-shaped body 10' facing to each other to join them.

As shown the above, according to the drainpipe 10, by concentrating the flow of the fluid to the concave portions 10a, 10a, . . . , it is possible to increase the flowing speed of the fluid in the concave portion 10a, and in the end portion on the downstream side of the drainpipe, it is also possible to outflow the fluid only from the concave portion 10a. This makes it possible to inhibit freezing of the fluid inside the pipe, and at the same time, it is possible to inhibit growing of the ice pillars at the end portion on the downstream side of the drainpipe. In other words, according to the drainpipe 10, it is possible to hydrodynamically inhibit freezing of the fluid, to thereby prevent blockage of the drainpipe, without providing heat energy from outside.

Meanwhile, the inventors of the present invention have found out that when snow accumulated on a roof of a house or a building is discharged by a drainpipe, discharging water freezes easily with getting close to the downstream side of the drainpipe. In other words, as the discharging water gets close to the ground, the discharging water becomes easy to freeze. In this view point, the drainpipe to be installed to a house or a building can be configured such that only a part where the discharging water easily freezes (for example, only the downstream side of the drainpipe) has a structure like the drainpipe 10 according to the present invention.

1.2. Second Embodiment

Figure 5:
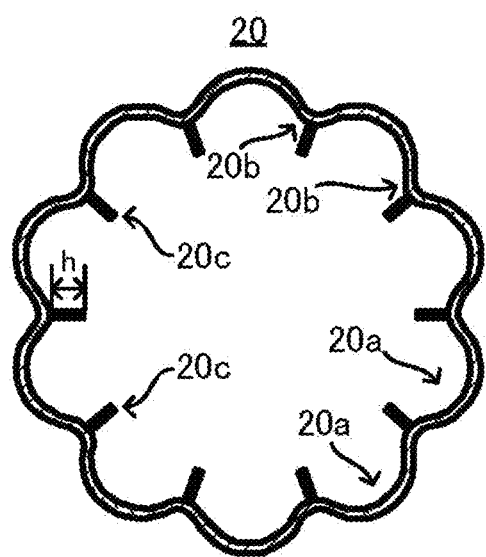
FIG. 5 is a view schematically showing a cross sectional shape of a drainpipe 20 according to the present invention.

In FIG. 5, a cross-sectional surface of the drainpipe 20 according to a second embodiment of the present invention is schematically shown. As shown in FIG. 5, at the inner wall of the drainpipe 20, the concave portions 20a, 20a, . . . and the convex portions 20b, 20b, . . . provided along the flowing direction of the fluid (the longitudinal direction of the pipe) are comprised. On top portions of the convex portions 20b, 20b, . . . , walls 20c, 20c, . . . are provided respectively along the flowing direction of the fluid (the longitudinal direction of the pipe). The drainpipe 20 has the same configuration as that of the above mentioned drainpipe 10, except for comprising the walls 20c, 20c, . . . .

In the drainpipe 20, height of each wall 20c of the walls 20c, 20c, . . . (length h in FIG. 5) can be adequately adjusted corresponding to assumed flowing amount of the fluid. For example, the height of the wall 20c can be same as depth of the concave portion 20a. The material of the wall 20c is not particularly limited. By comprising the walls 20c, 20c, . . . , the drainpipe 20 can inhibit the fluid from flowing over from one concave portion 20a of the concave portions into its adjacent another concave portion 20a of the concave portions, to thereby concentrate the flow of the fluid more efficiently. However, as mentioned above, the generation of the ice pillars at the end portion on the downstream side of the drainpipe tends to occur at the corner of the end surface. Therefore, in the drainpipe 20, the ice pillars are easy to come out at the corner of the end portion on the downstream side of the drainpipe (portion where the convex portion 20b and the wall 20c have contact to each other). In this viewpoint, the wall 20c can be configured such that the wall 20c is installed up to near the end portion on the downstream side of the drainpipe so that the corner is not created at the end portion on the downstream side.

1.3. Third Embodiment

Figure 6A:
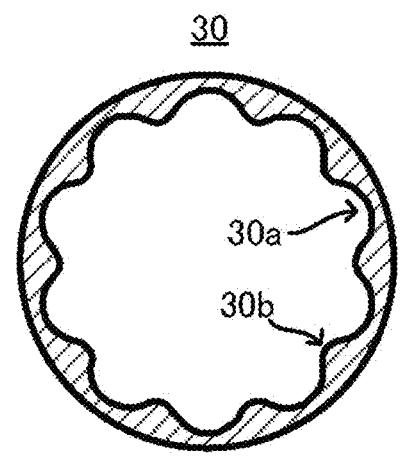
FIG. 6 is a view schematically showing cross sectional shapes of drainpipes 30 and 40 according to the present invention.

In the above description, a configuration in which the concave portion and the convex portion are provided to the drainpipe, and outer wall of the drainpipe has a waved shape in accordance with the shapes of the concave portion and the convex portion was shown as an example. However, the present invention is not limited to this configuration. Shape of the outer wall of the present invention is not particularly limited, as long as the present invention has a configuration in which the inner wall comprises the concentrating flow path. For example, the outer wall of the present invention can be configured such as a drainpipe 30, which comprises an outer wall having a circular shape, as shown in FIG. 6A.

1.4. Fourth Embodiment

Figure 6B:
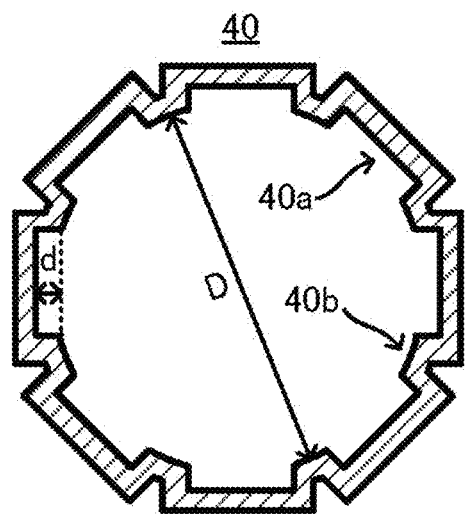

In the above description, the concave portion and the convex portion are explained as they are configured by curved surfaces. However, the present invention is not limited to this configuration. For example, the present invention can be configured such as a drainpipe 40 comprising a rectangular concave portion (groove) 40a and a convex portion 40b, as shown in FIG. 6B. Or, the present invention can be configured such as the drainpipe 100, which is mentioned below (FIGS. 15 and 16), comprising a concave portion 100a that has a corner.

1.5. Fifth Embodiment

In the above description, a configuration in which the present invention comprised a plurality of concave portions is explained. However, the present invention is not limited to this configuration. Hereinafter, a drainpipe provided with only one concave portion will be explained as a fifth embodiment.

Figure 7:
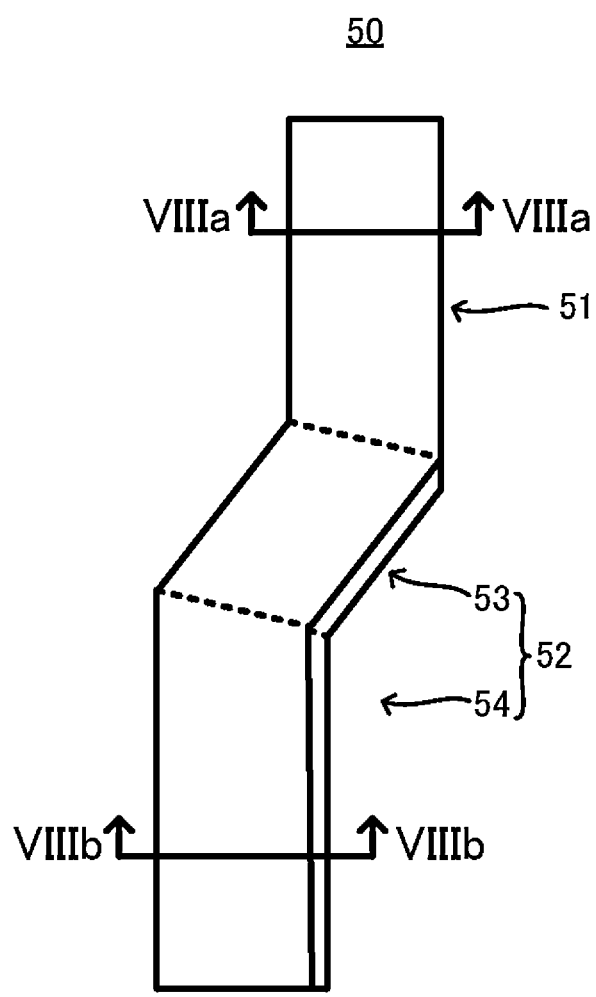
FIG. 7 is a schematic view to illustrate a drainpipe 50 according to the present invention.
Figure 8A:
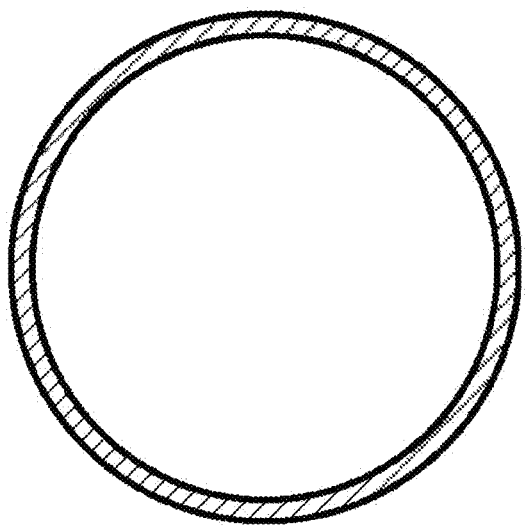
FIG. 8 is a schematic view to illustrate the drainpipe 50 according to the present invention.
Figure 8B:
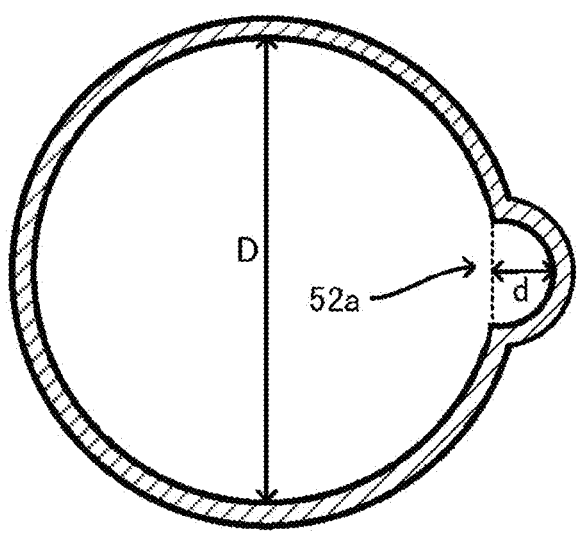

A drainpipe 50 according to the fifth embodiment of the present invention is shown in FIGS. 7, 8A and 8B. FIG. 7 is a view schematically showing appearance of the drainpipe 50. FIG. 8A is a view schematically showing a cross sectional shape taken along VIIIa-VIIIa of FIG. 7 and seen in the direction of the arrows. FIG. 8B is a view schematically showing a cross sectional shape taken along VIIIb-VIIIb of FIG. 7 and seen in the direction of the arrows. As shown in FIG. 7, the drainpipe 50 has a configuration in which an upper drainpipe 51 and a lower drainpipe 52 are connected.

As shown in FIGS. 7 and 8A, the upper drainpipe 51 is a cylinder-shaped pipe. As the drainpipe 51, a drainpipe that has been conventionally used can be applied. On the other hand, as shown in FIGS. 7 and 8B, the lower drainpipe 52 is comprised of a tilted portion 53 and a vertical portion 54 connected to an end portion on the downstream side of the tilted portion 53. Further, at an inner wall of the lower drainpipe 52, a convex portion 52a is provided along the flowing direction of fluid. As obvious from FIG. 7, the upper drainpipe 51 is connected to an upper end of the tilted portion 53 of the lower drainpipe 52, and the fluid flowed in from an upper end of the upper drainpipe 51 goes through the tilted portion 53 and the vertical portion 54 to be discharged from an end portion on the downstream side of the lower drainpipe 52.

Figure 9:
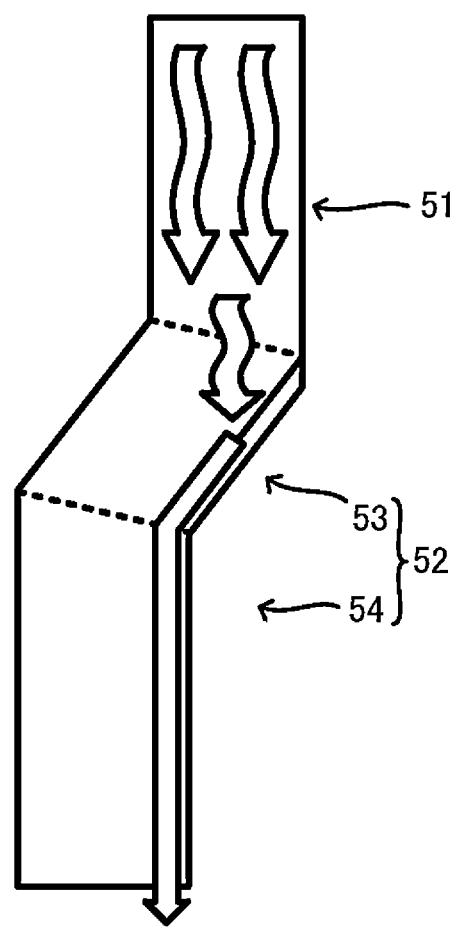
FIG. 9 is a schematic view to illustrate flow of fluid in the drainpipe 50 according to the present invention.

The flow of the fluid in the drainpipe 50 is shown in FIG. 9. As shown in FIG. 9, the fluid flowed in from the upper end of the upper drainpipe 51 flows down to lower side, then in the tilted portion 53, flows in a manner to concentrate to the concave portion 52a. The fluid concentrated to the concave portion 52a in the tilted portion 53, without diverging to the end, flows from the concave portion 52a of the tilted portion 53 into the vertical portion 54 along the concave portion 52a thereof, thereto flow out from the end portion on the downstream side of the concave portion 52a of the vertical portion 54.

As explained above, in the drainpipe 50 as well, it is possible to make the concave portion 52a function as the concentration flow path. Therefore, it is possible to increase the flowing speed of the fluid in the concave portion 52a, and at the same time, it is possible to discharge the fluid only from the concave portion 52a at the end portion on the downstream side of the drainpipe 50. This makes it possible to inhibit freezing of the fluid inside the pipe, and at the same time, it is possible to inhibit growing of the ice pillars at the end portion on the downstream side of the drainpipe. In other words, according to the drainpipe 50, it is possible to hydrodynamically inhibit freezing of the fluid, to thereby prevent blockage of the drainpipe without providing heat energy from outside.

1.6. Sixth Embodiment

Figure 10:
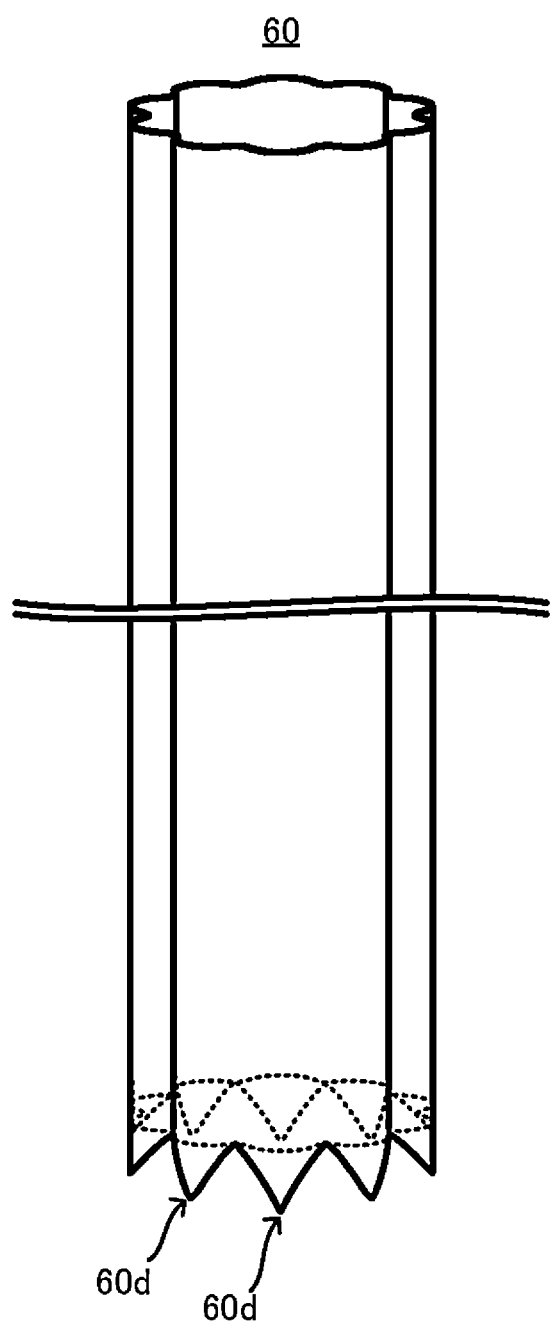
FIG. 10 is a schematic view to illustrate a drainpipe 60 according to the present invention.

An appearance of a drainpipe 60 according to a sixth embodiment of the present invention is schematically shown in FIG. 10. As shown in FIG. 10, the drainpipe 60 has a same cross sectional shape as that of the drainpipe 10. In addition to this, the drainpipe 60 comprises projecting portions 60d, 60d, . . . in an end portion on the downstream side of the drainpipe. Each projecting portion 60d of the projecting portions 60d, 60d, . . . is provided on extension of a downstream side of a concentrating flow path (concave portion) of the drainpipe 60, having a shape of tapering off to the end portion (convexed). The projecting portion 60d can be provided integral with the concentrating flow path, or can be provided separately from the concentrating flow path.

According to the drainpipe 60 that comprises the projecting portion 60d as described above, fluid that flows inside the drainpipe falls in drops and outflows from a tapered top end of the projecting portion 60d. That is, in the downstream side of the drainpipe 60, it is possible to generate the ice pillars concentrating to the top end of the projecting portion 60d to thereby inhibit growing the ice pillars in a circumferential direction. As a result of this, it is possible to prevent blockage of the top end on the downstream side of the drainpipe. In particular, by providing the projecting portion 60d on extension of the downstream side of the concentrating flow path, it is possible for the fluid flowed in the concentrating flow path to easily reach the top end of the projecting portion 60d. This makes it possible to efficiently generate the ice pillars only to the top end of the projecting portion 60d. However, even when the projecting portion 60d is not provided on extension of the downstream side of the concentrating flow path, the fluid flowed in the concentrating flow path streams down an end face from an upper end side of the projecting portion to reach the top end of the projecting portion, which also makes it possible to generate the ice pillars preferentially to the top end of the projecting portion 60d.

1.7. Seventh Embodiment

Figure 11:
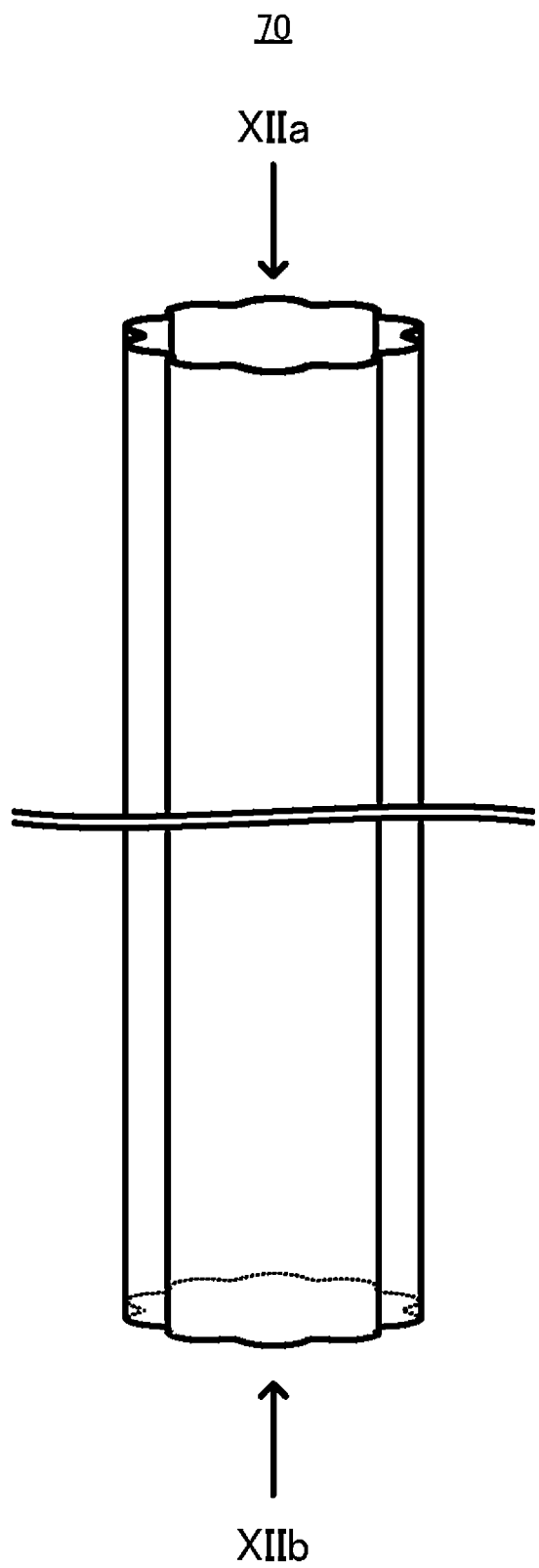
FIG. 11 is a schematic view to illustrate a drainpipe 70 according to the present invention.
Figure 12A:
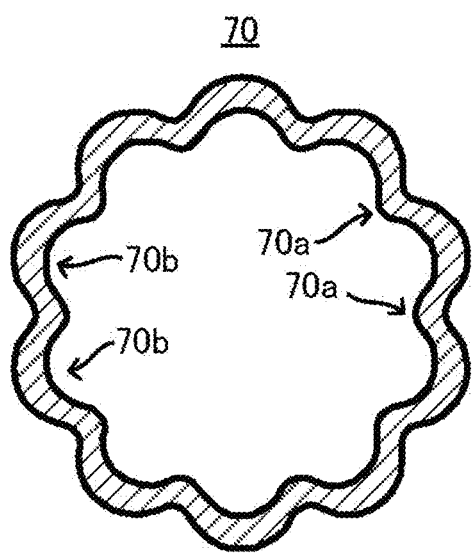
FIG. 12 is a schematic view to illustrate the drainpipe 70 according to the present invention.
Figure 12B:
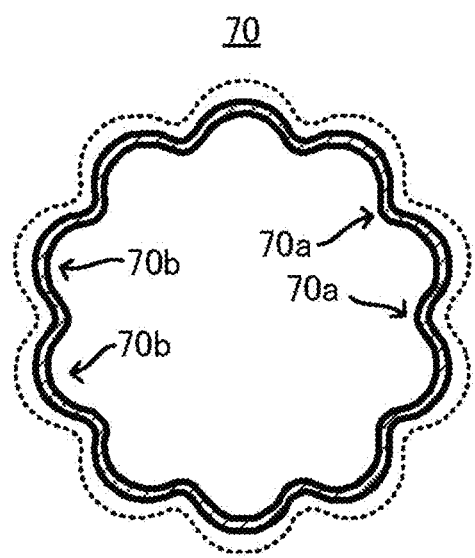

A drainpipe 70 according to a seventh embodiment of the present invention is schematically shown in FIGS. 11, 12A and 12B. FIG. 11 is a view to show an appearance of the drainpipe 70, FIG. 12A is a cross sectional view seen as a planar view (seen from the arrow XIIa of FIG. 11), and FIG. 12B is a cross sectional view of bottom surface (seen from the arrow XIIb of FIG. 11). As is obvious from FIGS. 11 and 12, the drainpipe 70 has concave portions 70a, 70a, . . . and convex portions 70b, 70b, . . . that are same as the concave portions and the convex portions of the drainpipe 10, on inner wall from an end portion of the upstream side to an end portion on the downstream side of the drainpipe 70, and is thin-walled at the end portion on the downstream side compared with the upstream side.

In the drainpipe 70, by making the end portion on the downstream side of the drainpipe thin-walled, it is possible to reduce the amount of the fluid that gathers to the end portion on the downstream side. This makes it possible to further inhibit the growing of the ice pillars, to thereby prevent the blockage of the end portion on the downstream side of the drainpipe more efficiently. Also, a thickness of a base portion of the ice pillar generated at the end portion on the downstream side of the drainpipe depends on the flowing speed of the fluid and the pipe wall thickness of the end portion on the downstream side of the drainpipe. As with the drainpipe 70, by providing the concave portion 70a to increase the flowing speed of the fluid, and at the same time by making the end portion on the downstream side of the drainpipe thin-walled, it is possible to keep the base portion of the ice pillars thin thereby making the ice pillars break easily. In other words, according to the drainpipe 70, since the ice pillars break on their own, it is possible to inhibit the growing of the ice pillars to thereby prevent the blockage of the end portion on the downstream side of the drainpipe more efficiently.

1.8. Eighth Embodiment

Figure 13:
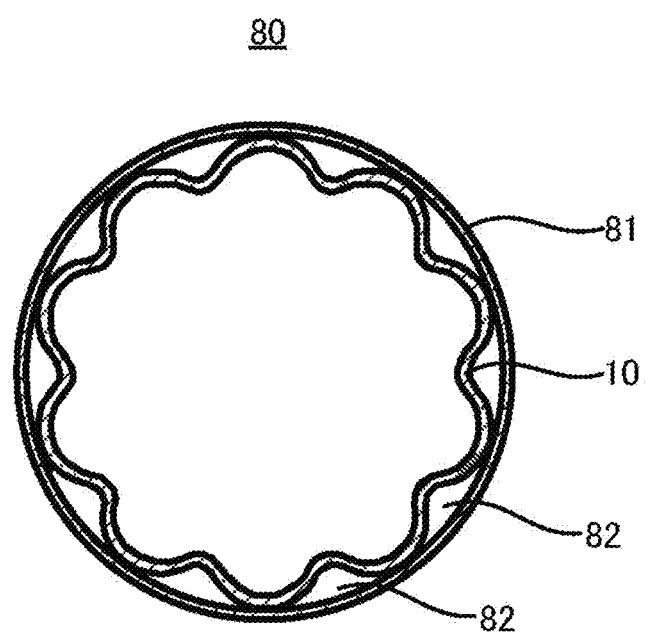
FIG. 13 is a view schematically showing cross sectional shape of a drainpipe 80 according to the present invention.

A cross sectional shape of a drainpipe 80 according to an eighth embodiment of the present invention is schematically shown in FIG. 13. As shown in FIG. 13, the drainpipe 80 comprises an outer pipe 81 outside the drainpipe 10 (inner pipe) in a manner that the outer pipe 81 covers the drainpipe 10 to have a double-pipe structure. In the drainpipe 80, the outer pipe 81 is a cylindrical pipe, and comprises an air layer 82 between the inner pipe 10 and the outer pipe 81.

The double-pipe structure as in the drainpipe 80 makes it possible to protect the inner pipe 10 that comprises the concentrating flow path, by the outer pipe 81. Also, by providing the air layer between the inner pipe 10 and the outer pipe 81, it is possible to make the air layer function as a heat insulting layer. This makes it possible to reduce influence from the temperature of outside of the pipe, to thereby further inhibit freezing of the fluid inside the pipe.

1.9. Ninth Embodiment

Figure 14A:
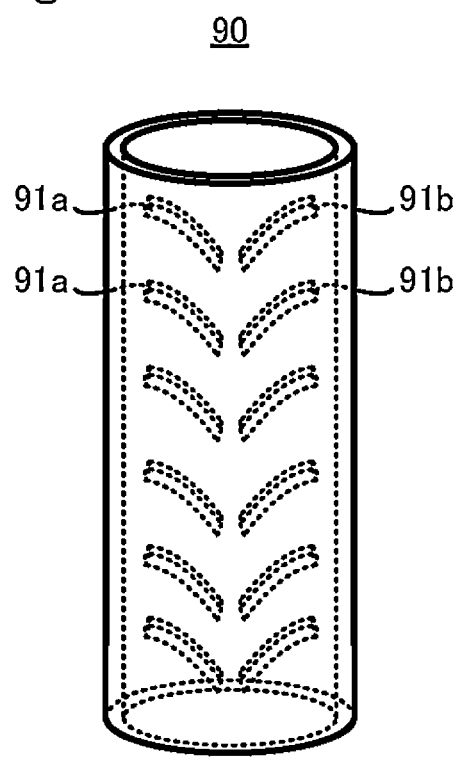
FIG. 14 is a schematic view to illustrate a drainpipe 90 according to the present invention.
Figure 14B:
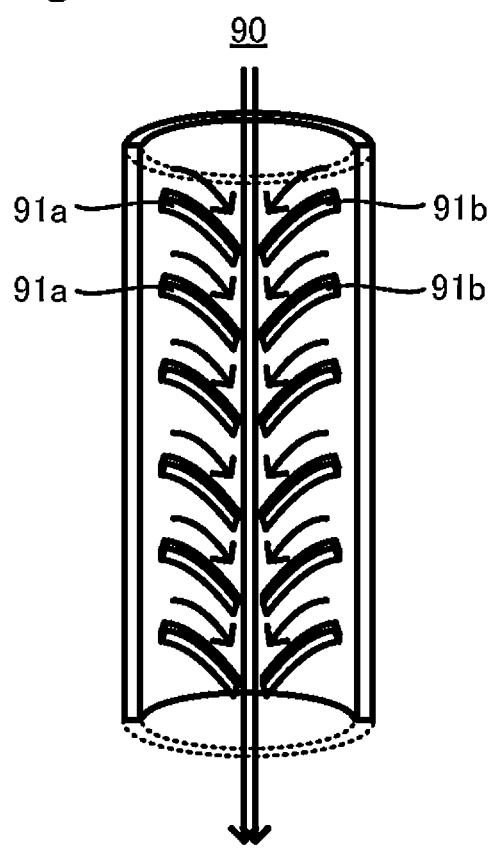

In the above description, a configurations in which the concave portion and the groove arranged to the inner wall of the pipe function as the concentrating flow path has been explained. However, the present invention is not limited to this configuration. A drainpipe 90 according to a ninth embodiment of the present invention is schematically shown in FIGS. 14A and 14B. FIG. 14A is a view schematically shows an appearance of the drainpipe 90, and FIG. 14B is a view to illustrate inner structure of the drainpipe 90.

As shown in FIG. 14A, the drainpipe 90 has a same configuration as that of a conventional cylindrical pipe in appearance. On the other hand, as shown in FIG. 14B, a plurality of strips 91a, 91a, . . . and other plurality of strips 91b, 91b, . . . to adjust flow path are provided to inner wall of the drainpipe 90. Each strip 91a of the plurality of strips 91a, 91a, . . . and each strip 91b of the other plurality of strips 91b, 91b, . . . are facing to each other, with their adjacent sides inclining to downstream side. In the drainpipe 90, as shown by the arrows in FIG. 14B, flow of the fluid streaming down inner wall is controlled by the strip 90a and the strip 90b, which makes it possible to concentrate the flow between the strip 90a and the strip 90b. That is, by directing the fluid from an upper end to a lower end of the strip, it is possible to form the concentrating flow path between the strip 90a and the strip 90b, which makes it possible to increase the flowing speed of the fluid in the concentrating flow path. Also, at the end portion on the downstream side of the drainpipe, it is possible to make the fluid discharge only from the concentrating flow path. This makes it possible to inhibit freezing of the fluid inside the pipe, and at the same time, it is also possible to inhibit growing of the ice pillars at the end portion on the downstream side of the pipe. As described above, according to the drainpipe 90 that does not comprise the concave portion or the groove as well, by having the concentrating flow path, it is possible to hydrodynamically inhibit freezing of the fluid, to thereby prevent blockage of the drainpipe without providing heat energy from outside.

1.10. Tenth Embodiment

Figure 15:
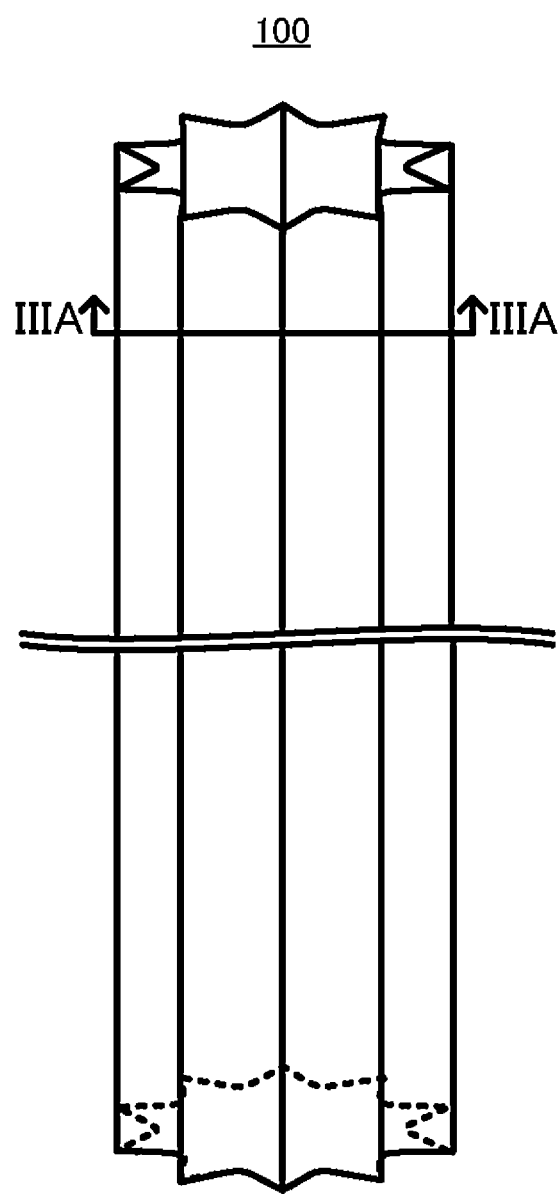
FIG. 15 is a schematic view to illustrate a drainpipe 100 according to the present invention.
Figure 16:
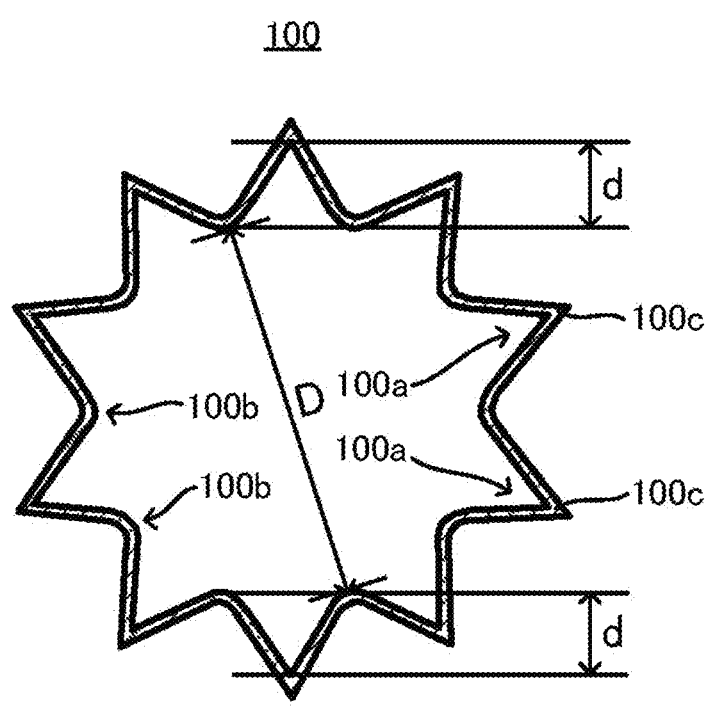
FIG. 16 is a view schematically showing a cross sectional shape of the drainpipe 100 according to the present invention.

The drainpipe 100 according to a tenth embodiment of the present invention is schematically shown in FIGS. 15 and 16. As already described, as in the drainpipe 100, in a case that the concentrating flow path has an apex convexed toward outside of the pipe in the cross sectional shape (in other words, for example, in a case that bottom portion of a concave portion 100a arranged to inner wall of the drainpipe is regarded as a corner portion 100c), in an end portion on the downstream side of the drainpipe 100, liquid drops are easily retained to the corner portion 100c then the corner portion 100c tends to be a generation point of the ice pillars. However, it is possible to increase the flowing speed of the fluid in the concave portion 100a, whereby the fluid becomes easy to flow from one place at the end portion on the downstream side of the drainpipe 100, which makes it difficult for the ice pillars to grow in the circumferential direction and toward the center direction. That is, even though there is a drawback that the liquid drops are easily retained to the corner portion, it is more effective for preventing blockage due to freezing of the pipe to give priority to a function to outflow the fluid from one place as the drainpipe 100.

It is also effective to have a drainpipe in which the upstream side is similar to the drainpipe 100 in shape, and the downstream side is similar to the drainpipe 10 in shape. In other words, increasing the flowing speed of the fluid in the concave portion 100a on the upstream side of the drainpipe, the downstream side of the drainpipe (for example, up to about 100 mm from the bottom end portion) can be made having a shape similar to the concave portion 10a.

1.11. Eleventh Embodiment

Figure 17:
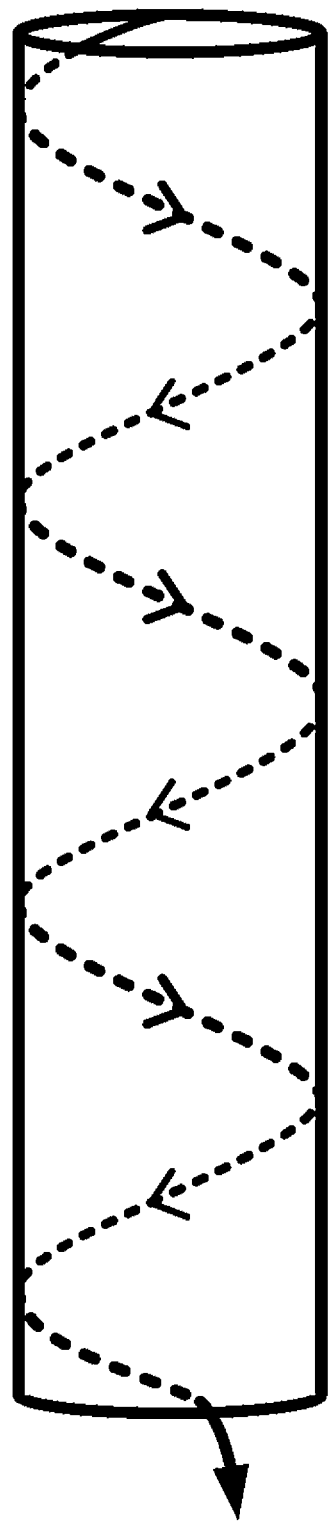
FIG. 17 is a schematic view to illustrate a drainpipe 110 according to the present invention.

A drainpipe 110 according to an eleventh embodiment of the present invention is schematically shown in FIG. 17. As shown in FIG. 11, on an inner wall of the drainpipe 110, a concave portion or a groove that function as the concentrating flow path is provided in a spinal manner. Even though the concentrating flow path is formed in a spinal manner, when the flowing amount of discharging water is large, the effect of the present invention is exerted. However, when the flowing amount of the discharging water is small, the discharging water is likely to run over the concave portion or the groove having a spinal shape, to thereby flow streaming down directly below. Therefore, in view of exerting the effect of the invention more notably, as described above, it is preferable to provide the concentrating flow path in a linear manner along the longitudinal direction of the drainpipe.

1.12. Other Embodiments

In the drainpipes of 10 to 110, by exercising ingenuity in the structure of the inner wall of the drainpipe, it is possible to hydrodynamically inhibit freezing of the fluid, to thereby prevent blockage of the pipe. On the other hand, by attending water repelling treatment to the inner wall and/or the end portion on the downstream side of the pipe, it is possible to inhibit generation of liquid membrane inside the pipe to thereby increase the flowing speed of the fluid inside the pipe, at the same time it is possible to reduce the amount of the fluid retained at the end portion on the downstream side of the pipe. In this case, by attending the water repellent treatment to the inner wall of the drainpipe in a striping manner, a difference may be made in flow speed of the fluid between an area where the water repellent treatment is applied and an area where the water repellent treatment is not applied.

That is, according to the drainpipe in which the water repellent treatment is applied, without providing heat energy from outside, it is also possible to hydrodynamically inhibit freezing of the fluid, to thereby prevent blockage of the pipe. As a configuration of the water repellent treatment, any of different kinds of water repelling treatment can be adopted, such as a configuration in which a known water treatment agent is applied, a configuration in which a surface structure of the inner wall and the end portion is controlled to be a water-shedding surface and the like.

Figure 18:
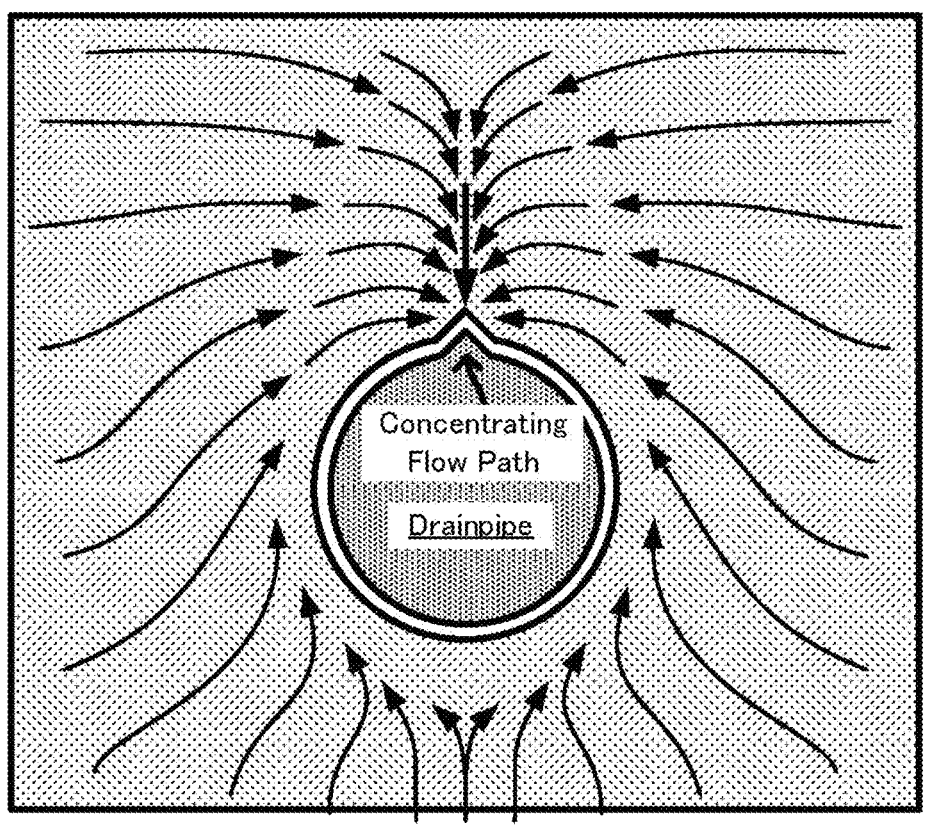
FIG. 18 is a schematic view to illustrate one example of flow of fluid that flows into a drainpipe.

It is also effective to exercise ingenuity with a configuration of introduction portion (vicinity of inlet) of the drainpipe. FIG. 18 is a schematic view of the upper surface of the drainpipe according to one embodiment of the present invention to describe flow of the fluid in the vicinity of inlet (flow of discharging water going toward the inlet of the drainpipe). As shown in FIG. 18, the discharging water that reached the vicinity of inlet of the drainpipe is, as shown by arrows in the Fig., by slope or groove arranged in the vicinity of inlet of the drainpipe, directed to the concentrating flow path. That is, by exercising ingenuity with the configuration of the vicinity of inlet of the drainpipe so that the discharging water is directed and flow in the concentrating flow path at the inlet of the drainpipe, it is possible to further concentrate the flow of the fluid inside the drainpipe, to thereby increase the flowing speed of the fluid inside the pipe, and at the same time, it is also possible to discharge the fluid only from a part of the end portion on the downstream side of the drainpipe. This makes it possible to inhibit freezing of the fluid inside the drainpipe and inhibit growing of the ice pillars at the end portion on the downstream side of the drainpipe.

Figure 19:
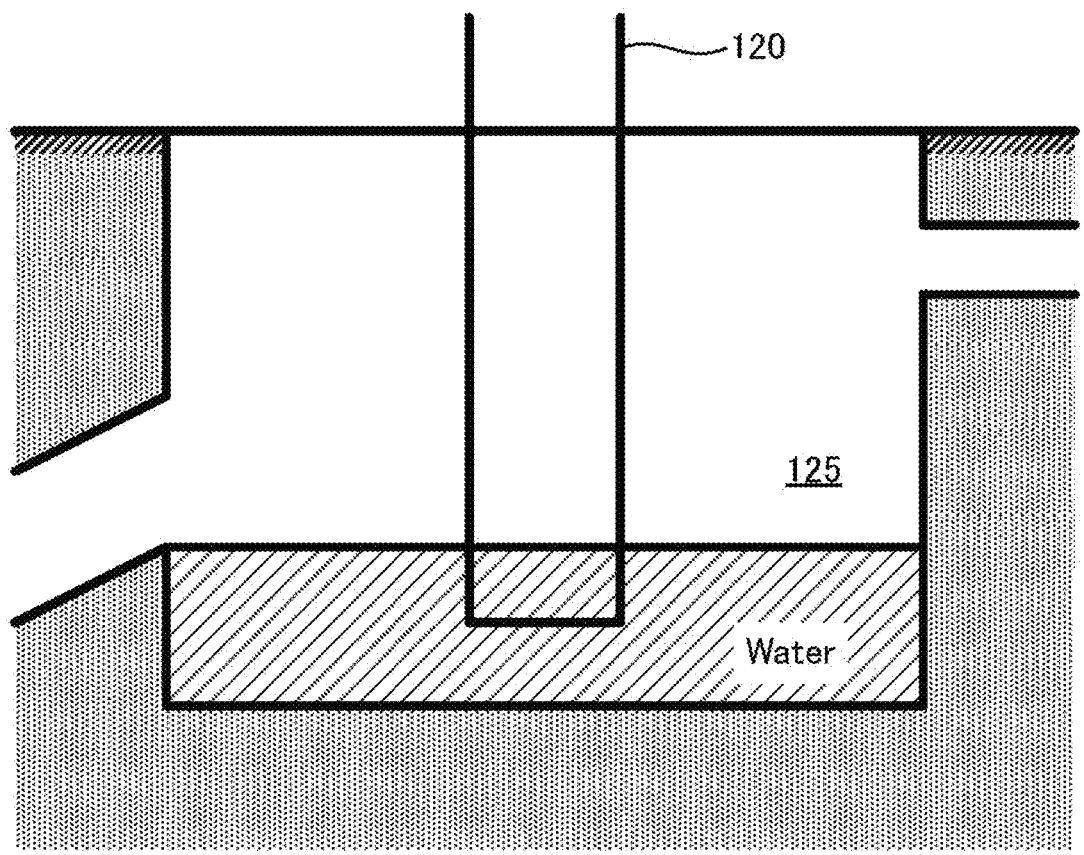
FIG. 19 is a schematic view to illustrate one example of a configuration of an end portion of a drainpipe.

Further, it is also effective to exercise ingenuity with a configuration of a discharging portion (vicinity of lower end portion) of the drainpipe. FIG. 19 is a schematic view to describe a configuration of the vicinity of the lower end portion of the drainpipe 120 according to one embodiment of the present invention. As shown in FIG. 19, the lower end portion of the drainpipe 120 is connected to a collection tub 125 provided in the ground. This configuration makes the lower end portion of the drainpipe 120 heated by geothermal heat, to thereby further inhibit freezing of the lower end portion. Or, if the water inside the collection tub 125 does not freeze because of geothermal heat, as shown in FIG. 19, by immersing the lower end portion of the drainpipe 120 down below the surface of the water in the collection tub 125, it is possible to inhibit freezing of the lower end portion further efficiently.

2. Method of Preventing Blockage of Drainpipe

In the above, drainpipe itself as the present invention has been described. On the other hand, the present invention also has an aspect as a method of preventing blockage of the drainpipe. That is, the method according to the present invention is a method of preventing blockage of a drainpipe due to freezing of fluid flowing inside the drainpipe, which is a blockage preventing method of the drainpipe comprising providing a concentrating flow path to concentrate flow of the fluid is provided to inner wall of the pipe, to thereby increase flowing speed of the fluid in the concentrating flow path.

The configuration of the concentrating flowing path and the like is as shown the above therefore the description will be omitted. As described above, by the method according to the present invention, it is possible to hydrodynamically inhibit freezing of the fluid, to thereby prevent blocking of the pipe without providing heat energy from outside.

In the blockage preventing method of the drainpipe according to the present invention, the effect is exerted further notably when the fluid is discharged streaming down the inner wall of the pipe. In other words, preferably the method is a preventing method of blocking of the drainpipe due to freezing of the fluid flowing inside the drainpipe, the method comprising the steps of: discharging the fluid streaming down an inner wall of the pipe; providing a concentrating flow path to concentrate the flow of the fluid, to thereby increase the flowing speed of the fluid in the concentrating flow path.

In particular, it is preferable to install the drainpipe in a manner that a longitudinal direction of the pipe and a vertical direction correspond to each other, to thereby drain off the fluid with streaming from an upper end side to a lower end side of the pipe. This is because the configuration exerts further notably freezing prevention effect and the effect of pipe blockage preventing due to freezing of the fluid.

It should be noted that, the term "a longitudinal direction of the pipe and a vertical direction correspond to each other" refers that the longitudinal direction of the pipe and the vertical direction do not have to completely correspond to each other, but ±5° of difference (that is, an angle between the longitudinal direction of the pipe and the horizontal direction is 85° or more to 95° or less) is allowed as an error range.

Further, there is no need that "the longitudinal direction of the pipe and the vertical direction correspond to each other" for entire part of the drainpipe, and if at least a part of the drainpipe has a portion in which "the longitudinal direction of the pipe and the vertical direction correspond to each other", it is included to the present invention.

3. Installation Structure of Drainpipe

The present invention also has an aspect as an installation structure of the drainpipe that is shaped so that the drainpipe is not to be blocked due to freezing of fluid when fluid is flowed inside the drainpipe. That is, a feature of the installation structure according to the present invention is that, in the structure, the drainpipe of the present invention described above is installed. In particular, it is preferable that the drainpipe is installed such that the longitudinal direction and a vertical direction correspond to each other, and in such a case, exerts further notably freezing prevention effect and the effect of pipe blockage preventing due to freezing of the fluid are exerted further notably.

EXAMPLES

Hereinafter, the drainpipe according to the present invention will be further described in reference to Examples, however, the present invention is not limited to the specific embodiments described below.

Using the drainpipe 10 shown in FIGS. 2 and 3 and a conventional cylindrical drainpipe, presence or absence of blockage of the drainpipes, and difference in growing of ice pillars were examined.

As the drainpipe 10, a drainpipe having a diameter of D70 mm, ten concave portions each having a depth of d13 mm, a pipe length of 1000 mm was employed. On the other hand, as the conventional cylindrical drainpipe, a cylindrical drainpipe having a bore of 96 mm, a pipe length of 1000 mm was employed. Experiment was carried out in a room under a low temperature of −15° C. After each portion of the drainpipe have had a temperature of −15° C., water (2° C.) was poured into the drainpipe continuously from the upper portion of the drainpipe. The flowing amount of discharging water was each set as 200 ml/min, adjusted so that the discharging water streamed down the inner wall of the drainpipe. The state of each end portion on the downstream side of the drainpipes after 7 hours from starting of the experiment is shown in FIGS. 20A and 20B. FIG. 20A shows a state in a case the conventional cylindrical drainpipe was employed, and FIG. 20B shows a state in a case the drainpipe 10 according to the present invention.

As shown in FIG. 20A, when the conventional cylindrical drainpipe was employed, as a result that flow of the fluid inside the drainpipe was diverged, ice pillars were generated all around in a circumferential direction of the end portion on the downstream side of the drainpipe, which became a large block blocking entire of the end portion on the downstream side of the drainpipe. On the other hand, as shown in FIG. 20B, when the drainpipe 10 according to the present invention was employed, growing of ice pillars in the end portion on the downstream side of the drainpipe was inhibited, the drainpipe, having opening sufficiently even after 7 hours has passed, was capable of discharging water without any problems. Also, when the drainpipe 10 was employed, it was confirmed that the ice pillars broke and fall off by their own after growing to and above certain point. As described, it became apparent that, by the drainpipe 10 according to the present invention, it is possible to inhibit freezing of the fluid hydrodynamically, to thereby prevent blockage of the pipe.

Inhibiting ability of blockage due to freezing of fluid was compared using the drainpipe 10 shown in FIGS. 2 and 3 and the drainpipe 100 shown in FIGS. 15 and 16. As the drainpipe 10, same drainpipe as the drainpipe mentioned above was employed. As the drainpipe 100, a drainpipe having a diameter of D80 mm, nine concave portions each having a depth of d11 mm, a pipe length of 1000 mm was employed. Experiment was carried out in a room under a low temperature of −15° C. or −25° C. After confirming that each portion of the drainpipe have had a temperature of −15° C. or −25° C., water (2° C.) was poured into the drainpipe continuously from the upper portion of the drainpipe. The flowing amount of discharging water was each set as 200 ml/min, adjusted so that the discharging water streamed down the inner wall of the drainpipe.

Under the temperature of −15° C., in both of the drainpipe 10 and the drainpipe 100, blockage of the pipe due to freezing of the fluid was not occurred. On the other hand, under the temperature of −25° C., blockage of the pipe due to freezing of the fluid was not occurred in the drainpipe 100, however, in the drainpipe 10, blockage of the pipe due to freezing of the fluid was confirmed after 2 hours has passed. That is, it was confirmed that, by having a cross sectional shape in which the concentrating flow path has a corner portion (apex) as the drainpipe 100, it is possible to further concentrate flow of the fluid, to thereby increase the flowing speed thus inhibit freezing of the fluid further efficiently.

Particularly, in the installment structure and freezing prevention method of the drainpipe described below, the effect of the present invention is exerted notably.

(A) An installation structure of drainpipe for preventing freezing by draining fluid streaming down inner wall of the pipe, the pipe installed so that the longitudinal direction of the pipe and the vertical direction substantially correspond to each other, wherein a plurality of concave portions or a plurality of grooves are provided to an inner wall of the pipe in a linear manner along the longitudinal direction, as a concentrating flow path to concentrate the flow of the fluid.

(B) An installation structure of a drainpipe for preventing freezing, by draining fluid streaming down inner wall of the pipe, wherein a plurality of concave portions or a plurality of grooves that have a corner portion in cross sectional shape as a concentrating flow path to concentrate flow of the fluid are provided in a linear manner along the longitudinal direction of the pipe.

(C) In an installation structure of a drainpipe installed so that the longitudinal direction of the pipe and the vertical direction substantially correspond to each other, freezing prevention method to prevent blockage of a drainpipe due to freezing of the fluid that flows inside the pipe, the method comprises the steps of: draining the fluid streaming down inner wall of the pipe; and providing a plurality of concave portions or a plurality of grooves, in an inner wall of the pipe, in a linear manner along the longitudinal direction, as a concentrating flow path to concentrate the flow of the fluid, to thereby increase the flowing speed of the fluid in the concentrating flow path.

(D) In an installation structure of a drainpipe, a freezing prevention method to prevent blockage of the drainpipe due to freezing of the fluid flowing in the pipe, the method comprises the steps of: draining the fluid streaming down an inner wall of the pipe; and providing a plurality of concave portions and a plurality of grooves, as a concentrating flow path, having a corner portion in the cross sectional shape, in a linear manner along the longitudinal direction of the pipe, to thereby increase the flowing speed of the fluid in the concentrating flow path.

Particularly, by employing an installation structure of a drainpipe according to a combination of the above mentioned (A) and (B), or, a freezing prevention method according to a combination of the above (C) and (D), a highly notable effect can be obtained. That is, when the pipe is on its side, the freezing prevention effect is highly exerted by forming the concentrating flow path according to the present invention, however, originally in the pipe that is on its side, diverge of discharging water is difficult to occur, even when just a cylindrical pipe without having the concentrating flow path was employed, and the discharging water flows concentrating to bottom portion of the inner wall to some extent. Also, in the pipe on its side, even when ice pillars are generated on an end portion on the downstream side in flowing direction of the discharging water, it is difficult for the ice pillars to grow in circumferential direction of the pipe, thus it is easy to avoid a problem of freezing and blocking of outlet of the pipe. In a cold region, the problem of freezing and blocking outlet of pipe especially occur in a drainpipe that is installed in vertical direction. In the drainpipe installed in vertical direction, by forming the concentrating having a corner portion, the freezing prevention effect and the prevention effect of blockage of the pipe due to freezing can be synergistically obtained by the present invention, by complex reasons shown below.

(Reason 1) Forming a shape having a corner portion, it is possible to prevent most effectively fluctuation of discharging water inside the pipe that tends to occur in the pipe installed vertical direction. That is, it is possible to make the corner portion function as the concentrating flow path to thereby prevent freezing inside the pipe.

(Reason 2) Forming a shape having a corner portion whereby the flow further concentrate, contacting area of the discharging water with inner wall of the drainpipe or the air inside the drainpipe becomes small, which makes it possible to reduce temperature decrease of the discharging water. This makes it possible to prevent further effectively freezing of the discharging water inside and to end portion of the pipe.

(Reason 3) By forming a shape having a corner portion, an ice pillar is preferentially generated to the corner portion in the lower end portion of the pipe. A thickness of the generated ice pillar depends on a shape or a thickness of the lower end portion of the drainpipe that is to be the generation point of the ice pillar. Therefore, the ice pillar generated in the corner portion is easy to be broken. Because of this, even though an ice pillar is generated to the lower portion of the pipe, the ice pillar easily breaks by flow of the discharging water, whereby blockage of the pipe due to growing the ice pillar in circumferential direction does not occur.

The present invention has been described above as to the embodiments which are supposed to be practical as well as preferable at present. However, it should be understood that the present invention is not limited to the embodiments disclosed in the specification of the present application and can be appropriately modified within the range that does not depart from the gist or spirit of the invention, which can be read from the appended claims and the overall specification, and that a drainpipe, blockage prevention method of the drainpipe, and installation structure of the drainpipe with such modifications is also encompassed within the technical range of the present invention.

Industrial Applicability

The present invention is a drainpipe having a novel structure that can inhibit freezing of the fluid flowing inside the drainpipe, to thereby prevent pipe blockage due to freezing of the fluid. The present invention suitably used, for example, in a cold region (place where the temperature is below freezing (0° C. or less), preferably −5° C. or less, more preferably −10° C. or less, still preferably −15° C. or less), as a drainpipe capable of efficiently discharging meltwater that is from snow accumulated on roof in winter and the like on the ground, without freezing inside the drainpipe or in the end portion on the drainpipe.

DESCRIPTION OF THE REFERENCE NUMERAL 10 drainpipe
10a concave portion
10b convex portion
20 drainpipe
20a concave portion
20b convex portion
20c wall
30 drainpipe
30a concave portion
30b convex portion
40 drainpipe
40a concave portion
40b convex portion
50 drainpipe
51 upper drainpipe
52 lower drainpipe
52a concave portion
53 tilted portion
54 vertical portion
60 drainpipe
60d projecting portion
70 drainpipe
70a concave portion
70b convex portion
80 drainpipe
81 outer pipe
82 air layer
90 drainpipe
91a, 91b strip
100 drainpipe
100a concave portion
100b convex portion
100c corner portion (apex)
110 drainpipe
120 drainpipe
125 water collecting pool

The invention claimed is:

1. An installation structure of a drainpipe for preventing blockage of the pipe due to freezing of fluid,
   wherein the drainpipe is installed so that a longitudinal direction of the drainpipe and the vertical direction correspond to each other;
   the fluid streams down an inner wall of the pipe;
   the inner wall of the pipe comprises at least one concave portion formed in a shape having a corner portion at a cross sectional shape, or comprises at least one groove formed in a shape having a corner portion at a cross sectional shape; and
   the concave portion or the groove is arranged in a plural manner and in a linear manner along the longitudinal direction of the pipe as concentrating flow paths to concentrate flow of fluid,
   wherein an end portion on the downstream side of the pipe is made to be thin-walled compared with an upstream side.

2. The installation structure according to claim 1, wherein a wall is provided between one of the plurality of the concentrating flow paths and another one of the plurality of the concentrating flow paths along the concentrating flow path on the inner wall of the pipe.

3. The installation structure according to claim 1, wherein a projecting portion is provided to an end portion on a downstream side of the pipe.

4. The installation structure according to claim 1, wherein a water repelling treatment is applied to the inner wall and/or an end portion on the downstream side of the pipe.

5. The installation structure according to claim 1, wherein the drainpipe further comprises an outer pipe to cover the pipe whereby the drainpipe has a double-pipe structure.

6. A method of preventing blockage of a drainpipe due to freezing of fluid that flows inside the drainpipe in an installation structure of the drainpipe arranged so that a longitudinal direction of the drainpipe and the vertical direction correspond to each other, the method comprising:
   making the fluid stream down the inner wall of the pipe;
   increasing a flowing speed of the fluid in the concentrating flow paths by providing a concave portion or a groove formed in a shape having a corner portion at a cross sectional shape, arranged in a plural manner and in a linear manner along the longitudinal direction of the pipe as concentrating flow paths that concentrate flow of the fluid; and
   making the end portion on the downstream side of the pipe thin-walled compared with an upstream side.

7. The method according to claim 6, the method comprising providing a wall between one of the plurality of the concentrating flow paths and another one of the plurality of concentrating flow paths along the concentrating flow path.

8. The method according to claim 6, the method comprising providing a projecting portion to an end portion on the downstream side of the pipe.

9. The method according to claim 6, the method comprising applying a water repelling treatment to the inner wall and/or an end portion on the downstream side of the pipe.

10. The method according to claim 6, the method further comprising providing an outer pipe to cover the pipe whereby the drainpipe has a double-pipe structure.

* * * * *